March 27, 1956  A. G. HUPP  2,739,584
WALL-OVEN

Filed Jan. 2, 1953  4 Sheets-Sheet 1

INVENTOR.
Arleigh G. Hupp
BY
Andrus & Scales
Attorneys

March 27, 1956  A. G. HUPP  2,739,584
WALL-OVEN
Filed Jan. 2, 1953  4 Sheets-Sheet 2

INVENTOR.
Arleigh G. Hupp
BY
Attorneys

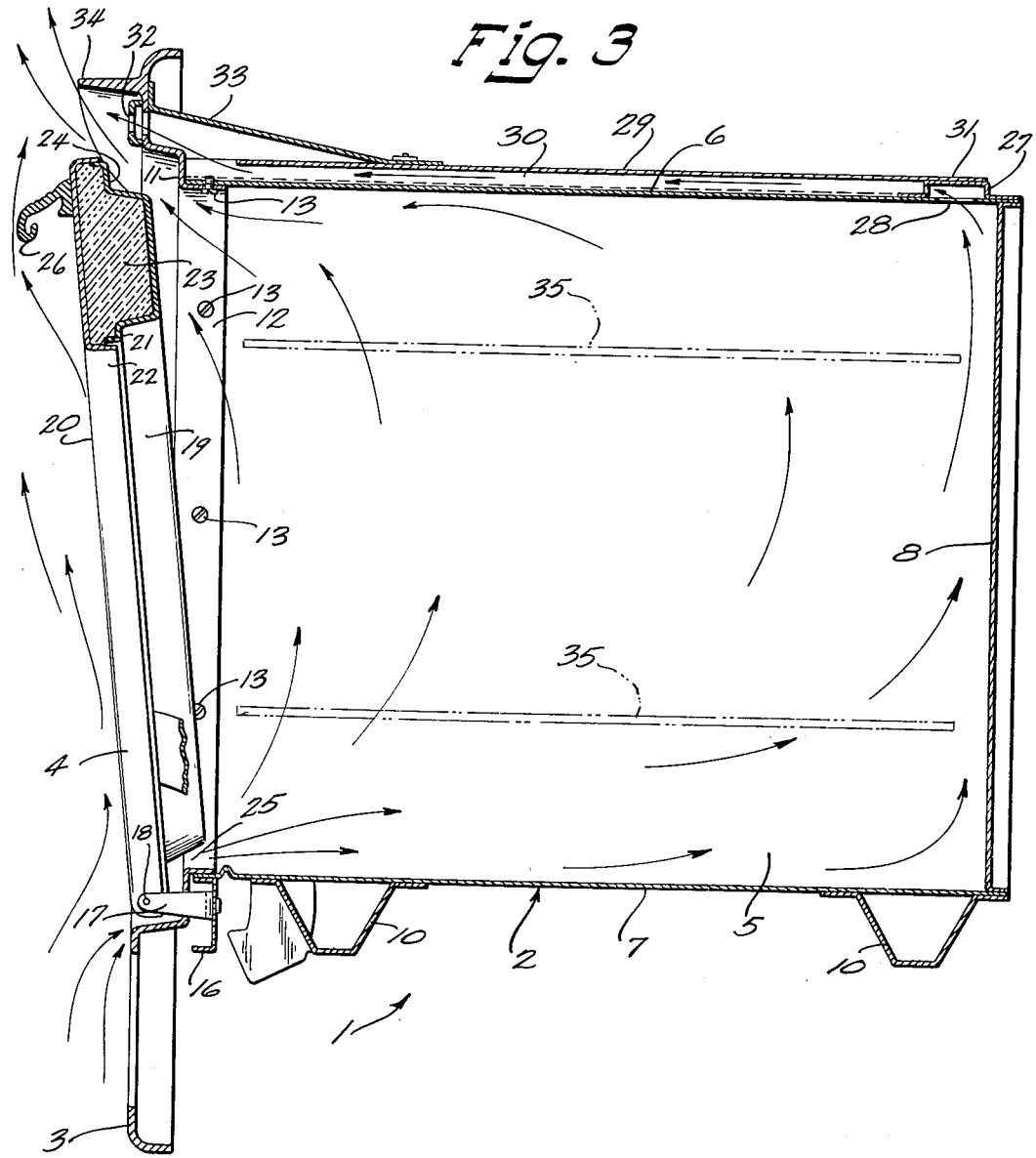

March 27, 1956   A. G. HUPP   2,739,584
WALL-OVEN
Filed Jan. 2, 1953   4 Sheets-Sheet 4

INVENTOR.
Arleigh G. Hupp
BY
Andrus & Scales
Attorneys

United States Patent Office 2,739,584
Patented Mar. 27, 1956

2,739,584

WALL-OVEN

Arleigh Glynn Hupp, New Albany, Ind., assignor, by mesne assignments, to Borg-Warner Corporation, Chicago, Ill., a corporation of Illinois Application January 2, 1953, Serial No. 329,245

6 Claims. (Cl. 126—21)

This invention relates to cooking ovens and particularly to wall type ovens adapted to be installed in the kitchen wall of a home.

The invention provides ventilation through the oven by means of an opening extending along the bottom side of the door and a series of vents at the rear of the oven which open into a manifold passage extending across the top of the oven and which communicates with the discharge passage extending across the top of the oven at the front of the oven for discharge above the door.

An object of the invention is to provide correct ventilation of the oven for broiling and baking purposes by means of vents entirely disposed at the front side of the oven.

Another object is to provide alternate controlled, even ventilation during heating or cooling of the oven by adjustment of the door.

Another object is to reduce the cross section of the passages necessary to the ventilation of the oven and similarly reduce the overall dimensions of the oven installation.

Another object is to arrange the circulation of air through the oven and the discharge therefrom so that a limited amount of such circulation is induced by convection currents moving upwardly within the room along the kitchen wall and upwardly past the door of the oven.

Another object is to utilize convection currents passing upwardly on the inside of the door and through the front part of the oven to effect a generally equal amount of circulation through the rear part of the oven and the circulation ducts provided.

These and other objects and advantages of the invention will be more fully set forth in the following description of a preferred embodiment of the invention as illustrated in the accompanying drawings.

In the drawings:

Fig. 3 is a view similar to Fig. 4 with the door opened slightly and with arrows showing the circulation of cooling air through the oven;

Figure 1:
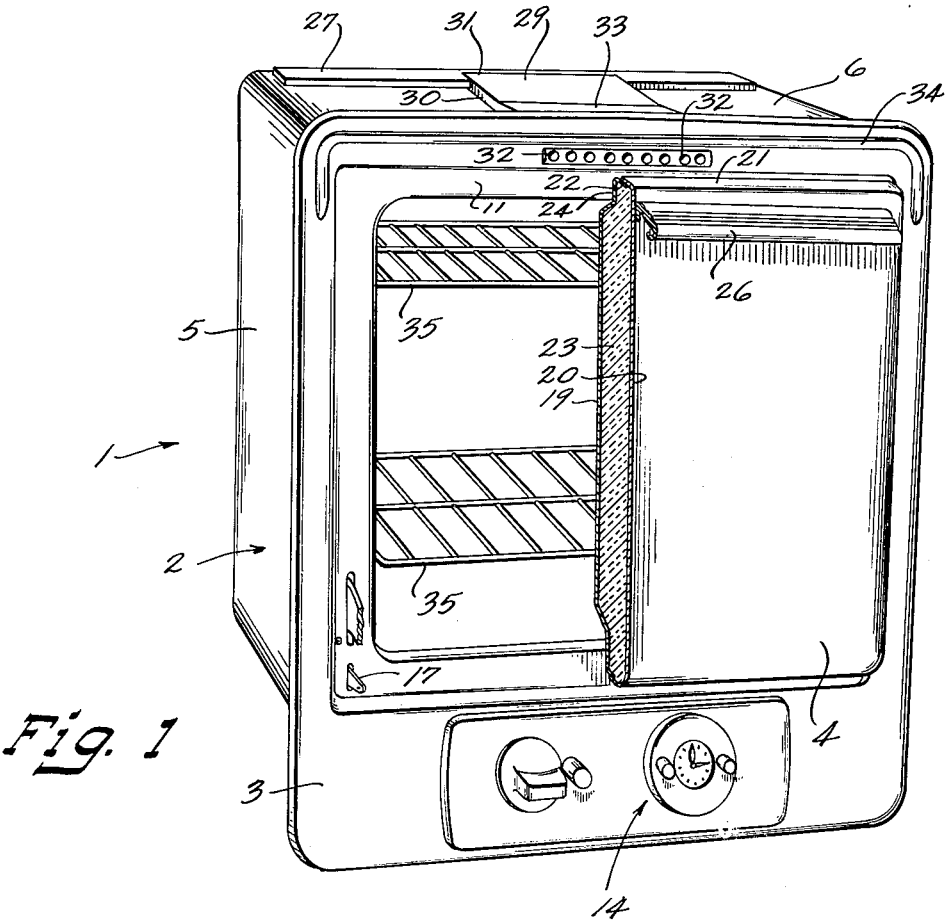
Figure 1 is a perspective view of the oven as installed in a kitchen wall, not shown, and with part of the door broken away and sectioned to show the interior of the oven.
Figure 2:
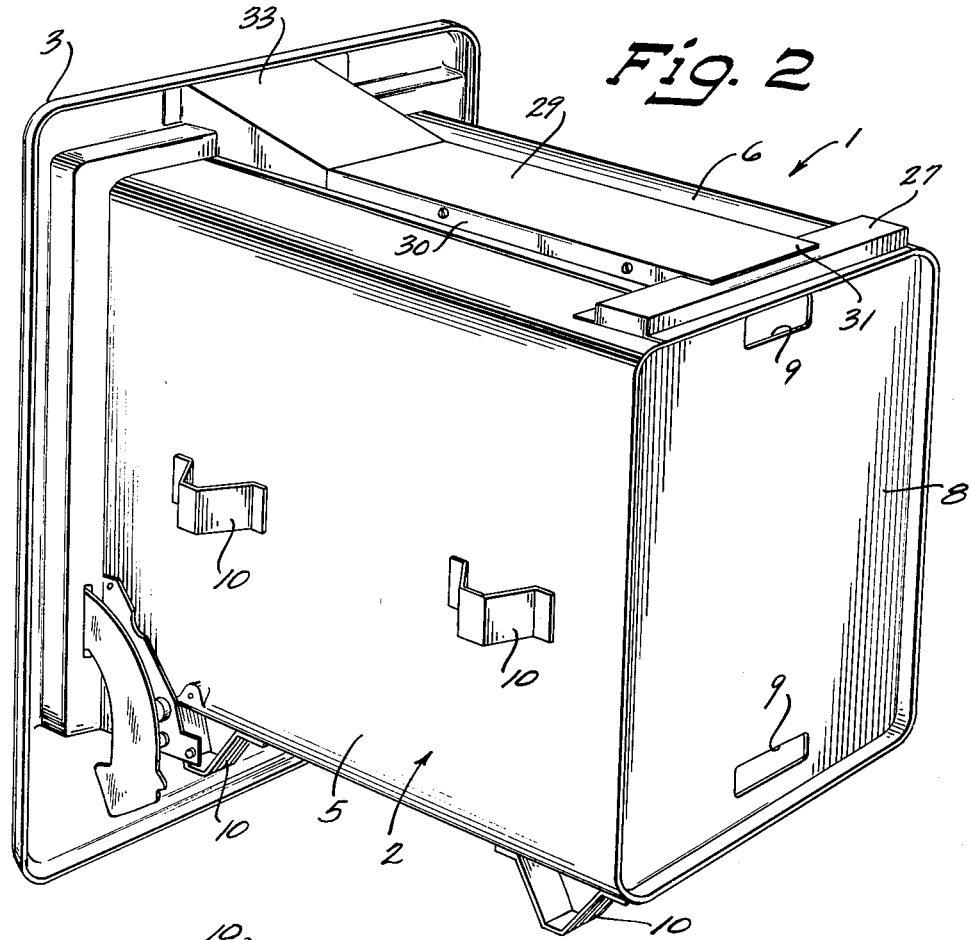
Fig. 2 is a perspective view of the oven unit prior to its installation in a kitchen wall.
Figure 5:
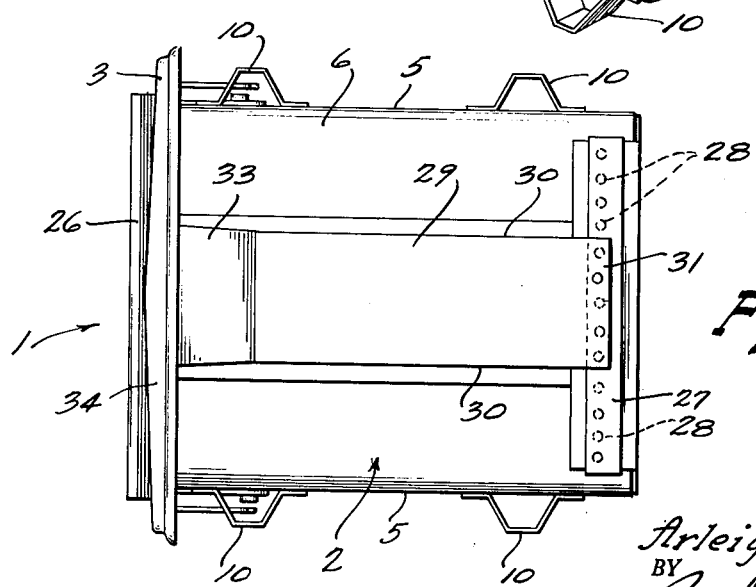
Fig. 5 is a top plan view of the oven.
Figure 4:
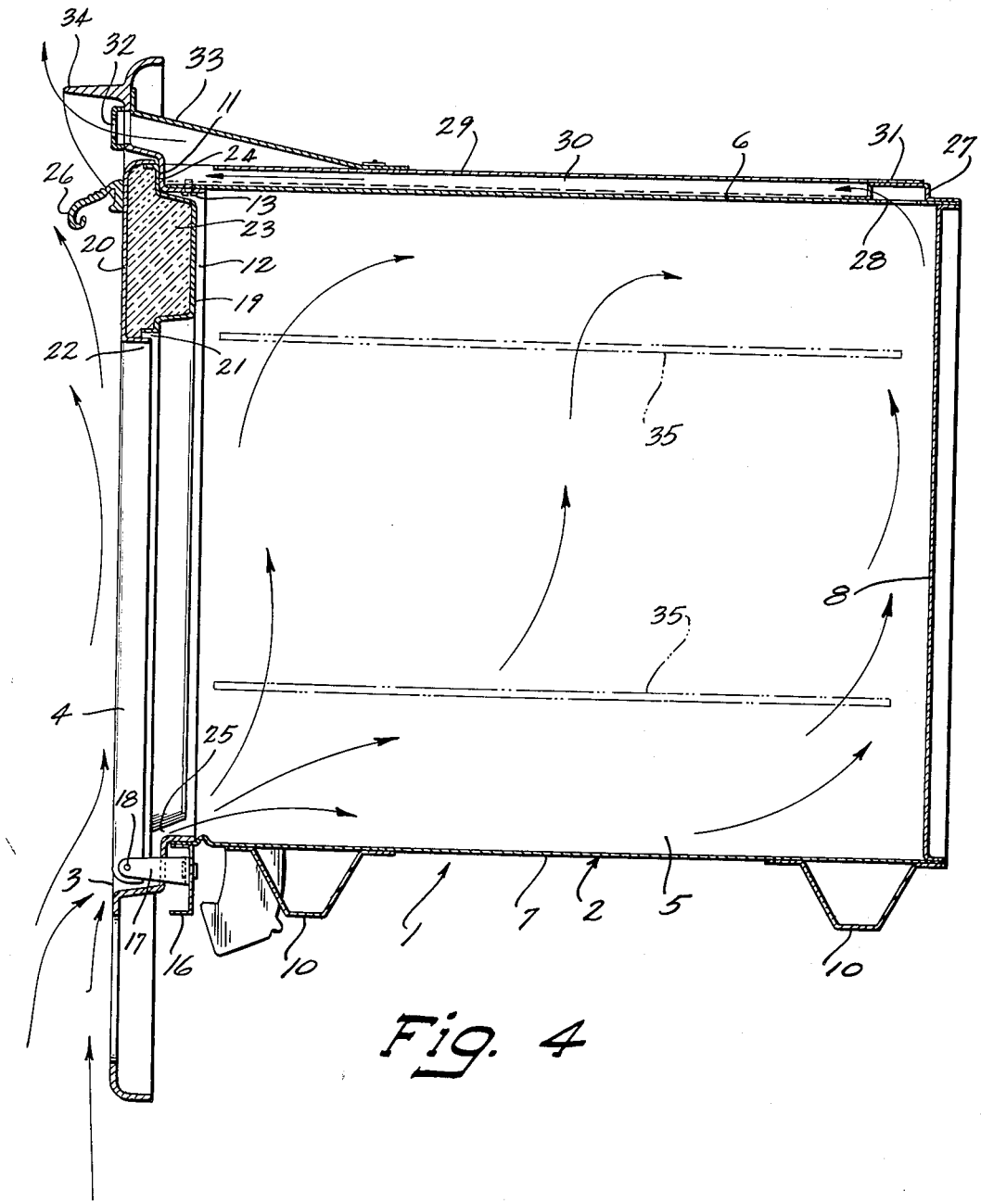
Fig. 4 is a vertical, longitudinal section through the oven and the circulation ducts with the door closed and arrows illustrating the circulation of air through the oven.

The oven 1 shown in the drawings includes the box 2, the front panel 3 which defines an opening for access to the box, and the door 4 mounted within the opening of the panel to close the same and the oven. The box 2 is of suitable sheet metal construction and includes the sides 5 and the top and bottom 6 and 7, respectively. The rear panel 8 is provided with the upper and lower openings 9 for the terminal connections of the heating elements, not shown, and such openings 9 are normally closed by the connections when the oven is installed.

The brackets 10 extend downwardly and laterally from the box support and space the box 2 within the structural framework of the kitchen wall. Suitable insulation, not shown, is placed around the box 2 to protect structural members near the oven front by over heating and the danger of fire.

The front panel 3 is adapted to be placed over the opening in the kitchen wall to conceal the opening and is provided with a rectangular recess to receive the door 4. The inner face 11 of the recess is provided with the flanges 12 which extend inwardly of box 2 and define a smaller rectangular opening which provides access to box 2 of the oven when the door is opened.

The screws 13 secure flanges 12 within the front open end of box 2 to support panel 3 over the kitchen wall opening and suitable control means as at 14 are carried by panel 3 beneath the opening thereof.

The channel member 16 extending across the bottom 7 of box 2 at the inside of panel 3 carries the brackets 17 which project through face 11 of panel 3 and carry the hinged pins 18 to support the door 4 within the recess of panel 3 for swinging the door downwardly to open the oven.

The door 4 comprises stamped inner and outer sheetmetal members 19 and 20 respectively joined at the periphery thereof by corresponding flanges 21 and 22 to provide a hollow construction adapted to be filled with an insulating material 23. The inner member 19 of door 4 is stepped around its periphery to provide a marginal face 24 which is adapted to engage the face 11 of panel 3 along the top and sides of the opening in the panel. According to the invention, a clearance is provided along the bottom of the door as at 25 to allow the entry of air to box 2 of the oven when the door is closed as in baking or with the door partly open to provide for cooling of the oven after baking and the like.

The door handle 26 is secured to the outer member 20 of door 4 and extends along the top thereof for manipulation of the door to an open or closed position or the position shown in Figure 3, wherein the upper end of the door is disposed forwardly of panel 3 to provide an opening at the front of the oven equal to or larger than the opening provided beneath the door.

The cross member 27 having downwardly formed flanges is secured to the top 6 of box 2 and extends along the rear thereof as a manifold to receive the air from the oven through the series of openings 28 in top 6. The duct 29 having downwardly formed side flanges 30 extends longitudinally of the oven and is secured to the top 6 of box 2 so that the rear projection 31 of the duct overlaps manifold 27 which latter opens into the duct thereat. The forward end of duct 29 terminates behind panel 3 and communicates with the series of holes 32 in the panel. The cover 33 is secured to top 6 of box 2 over the forward open end of duct 29 and holes 32 to conduct the air from the duct through the holes for discharge through panel 3 into the room.

The projecting flange 34 which is formed integrally with panel 3 extends forwardly thereof along the top of the panel and over holes 32 to prevent the discharged heated air from engaging the wall above the oven.

In the operation of the oven, the food is supported in a suitable pan, not shown, on one end of the racks 35 disposed horizontally within the oven and heated during heating circulation of air through the oven box 2 with door 4 closed, the air enters the oven beneath as at 25 and rises in the oven and moves rearwardly therein to openings 28 in the top 6 and into manifold 27. From manifold 27 the air passes into duct 29 and moves therein forwardly towards panel 3 for discharge through holes 32 into the room. When the door is closed, a certain amount of heat is lost through insulation 23 which heats the outside air within the room in front of the door and causes a sweep of air to rise by convection upwardly in front of the door and upwardly past holes 32. The forward dimensions of handle 26 and flange 34 protect holes 32 so that the air passing the same effects a withdrawal of the air from duct 29 and promotes the circulation of air through the box 2 of oven 1, as described.

The additional circulation of air through box 2 allows manifold member 27 and duct 29 to be of relatively less cross section so that overall dimensions of the box and the opening in the kitchen wall required therefor may be reduced.

The controlled circulation of air through box 2 of the oven for cooling the oven gradually is provided for by opening door 4 so that the upper end thereof is generally disposed beneath the forward edge of flange 34 and an opening is allowed between the upper end of the door and panel 3 for the air within the forward part of the oven. Suitable spring balance or friction means, not shown, may be provided to secure the door selectively in such position as shown in Figure 3. In cooling, the air enters box 2 of the oven beneath door 4 as at 25 and part of the air rises within the oven and passes therefrom through the opening in panel 3 above the door. The other part of the air entering the oven beneath the door passes rearwardly in box 2 and rises therein to openings 28 into manifold 27 from where it passes through duct 29 and holes 32. The air passing in front of the door and the air from box 2 of the oven which passes through panel 3 above door 4 combine to provide draft similar to that provided with the door as described to effect such further circulation of air from the rear part of the box 2 of the oven so that an even distribution of air and cooling within the oven is effected. The oven is thereby adapted to be disposed or installed in a kitchen wall without special built-in ducts for the air circulation through the oven. This allows the oven to be installed directly within a smaller opening provided within the kitchen wall.

The oven 1 is adapted to be mounted in an outer rectangular box, not shown, of non-inflammable construction and installed within the opening of the kitchen wall. Panel 3 is adapted to close the front of the box which serves to retain the insulation, not shown, to be placed around the oven within the outer box.

With the circulation through the oven of a controlled amount of air entering at room temperature, the air passing through manifold member 27 and duct 29 is of a constant, safe temperature which never exceeds a predetermined safety factor so that only a nominal outer insulation above the duct is required for safety purposes and the size of the wall opening and outer box may be correspondingly smaller.

By this construction the invention eliminates costly vent pipes in the wall.

Various embodiments of the invention may be employed within the scope of the accompanying claim.

I claim:

1. In an oven for installation in a kitchen wall and the like, a generally rectangular box having a door for cooperating with an opening formed in the front of the box, hinges for supporting the door within said opening whereby the door is adapted to substantially close the opening, the door and said opening of the box being dimensioned and arranged to provide an intake opening beneath the door and extending generally the width of the box for entry of air to the lower part of the oven at the front thereof, a manifold extending across the top of the box at the rear thereof, the upper end of the box having a series of exhaust openings extending across the rear thereof and opening into said manifold, a duct communicating with said manifold and extending forwardly along the top of the box to the front thereof, said duct communicating with a series of discharge vents opening above said door, and a baffle carried by said box and extending horizontally over said discharge vents and said door whereby the sweep of air in front of the door, as induced by convection, passes said baffle and discharge vents to draw the air therethrough and from said lower front opening through the oven to the upper rear exhaust openings into said manifold and through the duct.

2. In an oven for installation in a kitchen wall and the like, a generally rectangular box having a door for cooperating with an opening formed in the front of the box, hinges for supporting the door within said opening whereby the door is adapted to be adjusted to a position providing a limited vent extending across the top thereof within the opening of the box, the door and said opening of the box being dimensioned and arranged to provide an intake opening beneath the door and extending generally the width of the box for entry of air to the lower part of the oven at the front thereof, a manifold extending across the top of the box at the rear thereof, the upper end of the box having a series of exhaust openings extending across the rear thereof and opening into said manifold, a duct communicating with said manifold and extending forwardly along the top of the box to the front thereof, said duct communicating with a series of discharge vents opening above said door, a baffle carried by said box and extending horizontally over said discharge vents and said door, and means for securing said door in an inclined position with the upper forward part thereof beneath the front edge of said baffle whereby the sweep of air on both sides of the door, as induced by convection, passes said baffle and discharge vents to draw the air therethrough and from the oven through the upper rear exhaust openings into said manifold and duct.

3. An oven for installation in a kitchen wall, comprising a generally rectangular box having an open front end and adapted to be secured within an opening in the kitchen wall with the open end thereof adapted to be positioned generally flush with the wall, a panel having a recess in the face thereof and flanges defining an opening in said recess, said panel flanges being secured within the open end of the box to support the panel so that the latter extends over the opening in the kitchen wall to cover the same, a door supported within said recess of the panel to close the box and having outer marginal faces to engage the recess and close the box, the lower edge of said door together with the lower portion of the box defining a limited opening extending below the bottom edge of the door for entry of air into the box, a manifold extending across the top of the box at the rear thereof, the upper end of the box haxing a series of exhaust openings extending across the rear thereof and opening into said manifold, a duct communicating with said manifold and extending forwardly along the top of the box to the front thereof, said duct having a series of discharge vents opening above said door, and a baffle carried by said box and extending horizontally over said discharge vents and said door whereby the sweep of air in front of the door as induced by convection passes said baffle and discharge vents to draw the air therethrough and from said lower front opening through the oven to the upper rear exhaust openings into said manifold and through the duct.

4. In an oven for installation in a kitchen wall and the like, a generally rectangular box having a door for cooperating with an opening formed in the front of the box, hinges for supporting the door within said opening whereby the door is adapted to be adjusted to a position providing a limited vent extending across the top thereof within the opening of the box, said oven having an air intake opening beneath the door for entry of air to the lower part of the oven at the front end thereof, a manifold extending across the top of the box at the rear thereof, the upper end of the box having a series of exhaust openings extending across the rear thereof and opening into said manifold, a duct communicating with said manifold and extending forwardly along the top of the box to the front thereof, said duct communicating with a series of discharge vents opening above said door, and a baffle carried by said box and extending horizontally over said discharge vents and said door whereby the sweep of air in front of the door, as induced by convection, passes said baffle and discharge vents to draw the air therethrough and from said lower front opening through the oven to the upper rear exhaust openings into said manifold and through the duct.

5. In an oven for installation in a kitchen wall and the like, a generally rectangular box having a door for cooperating with an opening formed in the front of the box, hinges for supporting the door within said opening whereby the door is adapted to be adjusted to a position providing a limited vent extending across the top thereof within the opening of the box, said oven having an air intake opening beneath the door for entry of air to the lower part of the oven at the front end thereof, the box having a series of discharge vents above the door and communicating with the interior of the box and a baffle carried by said box and extending horizontally over said discharge vents and said door whereby the sweep of air in the front of the door, as induced by convection, passes said baffle and discharge vents to draw the air through said intake opening and through the interior of the box for discharge through said discharge vents.

6. In an oven for installation in a kitchen wall and the like, a generally rectangular box having a door for cooperating with an opening formed in the front of the box, hinges for supporting the door within said opening whereby the door is adapted to be adjusted to a position providing a limited vent extending across the top thereof within the opening of the box, said oven having an air intake opening beneath the door for entry of air to the lower part of the oven at the front end thereof, the box having a series of discharge vents above the door and communicating with the interior of the box, a baffle carried by said box and extending horizontally over said discharge vents and said door whereby the sweep of air in the front of the door, as induced by convection, passes said baffle and discharge vents to draw the air through said intake opening and through the interior of the box for discharge through said discharge vents, and a handle extending across the top portion of the door, said handle being formed to constitute a shield and being of a length so as to register with the horizontal extent of said discharge vents, said handle and baffle cooperating, when the door is in closed position, to effect withdrawal of air from the oven through said discharge vents, by convection air currents moving upwardly past said handle and baffle.

References Cited in the file of this patent

UNITED STATES PATENTS

| | | |
|---|---|---|
| 235,640 | Morton | Dec. 21, 1880 |
| 2,367,007 | Cossin | Jan. 9, 1945 |
| 2,511,328 | Cline | June 13, 1950 |
| 2,526,890 | Mendel | Oct. 24, 1950 |
| 2,536,513 | O'Keefe | Jan. 2, 1951 |
| 2,555,841 | Clark | June 5, 1951 |